(12) United States Patent
Rolle (10) Patent No.: US 11,657,034 B2
(45) Date of Patent: May 23, 2023

(54) DATA CONSISTENCY IN MASTER DATA INTEGRATION

(71) Applicant: SAP SE, Walldorf (DE)

(72) Inventor: Benny Rolle, Goettingen (DE)

(73) Assignee: SAP SE, Walldorf (DE)

( * ) Notice: Subject to any disclaimer, the term of this patent is extended or adjusted under 35 U.S.C. 154(b) by 79 days.

(21) Appl. No.: 17/216,367

(22) Filed: Mar. 29, 2021

(65) Prior Publication Data

US 2022/0309052 A1    Sep. 29, 2022

(51) Int. Cl.
*G06F 16/23* (2019.01)
*G06F 9/448* (2018.01)
*G06F 9/38* (2018.01)
*G06F 16/28* (2019.01)

(52) U.S. Cl.
CPC ........ *G06F 16/2365* (2019.01); *G06F 9/3865* (2013.01); *G06F 9/4488* (2018.02); *G06F 16/2308* (2019.01); *G06F 16/289* (2019.01)

(58) Field of Classification Search
CPC .. G06F 16/2365; G06F 9/4488; G06F 16/289; G06F 16/2308; G06F 9/3865
See application file for complete search history.

(56) References Cited

U.S. PATENT DOCUMENTS

| 2013/0304234 A1* | 11/2013 | Szurek | G05B 19/02 700/28 |
| 2015/0199744 A1* | 7/2015 | Tolvanen | G06F 16/9537 707/737 |

OTHER PUBLICATIONS

CPA Global "Pre-Filing Search Results CP300212-200299", Jul. 30, 2020, 18 pages.
Naeem Tehreem, "A Beginner's Guide to Master Data Management", Astera, Sep. 25, 2019, 5 pages.
Kulkarni Sachin et al., "Concurrent Maintenance of Views Using Multiple Versions", Aug. 1999, 6 pages.
Davis Benjamin et al., "DBTaint: Cross-Application Information Flow Tracking via Databases", Sep. 2010, 12 pages.
"Structuring Data for Strong Consistency" Google Cloud Guide, Jul. 30, 2020, 7 pages.
Bello, Luciano et al., "Towards a Taint Mode for Cloud Computing Web Applications", Jun. 2012, 12 pages.
"Transaction Locking and Row Versioning Guide—SQL Server" Microsoft SQL Docs, Mar. 10, 2020, 89 pages.

* cited by examiner

*Primary Examiner* — Ashish Thomas
*Assistant Examiner* — Dustin D Eyers
(74) *Attorney, Agent, or Firm* — Fountainhead Law Group P.C.

(57) ABSTRACT

An update system may be used to update referenced data objects that are used by multiple applications. In some cases incorrect data may be entered and later corrected. Data consistency techniques are described herein to help avoid use of incorrect data before the data is corrected. A communication from the update system may include updated master data objects and an indication that there are further updates queued. A flag may be set for each of the updated master data objects as they are stored in a database. Then when a request to access those objects is received, the request may be denied when the flag set, thereby preventing access to potentially incorrect or outdated data.

20 Claims, 6 Drawing Sheets

DATA CONSISTENCY IN MASTER DATA INTEGRATION

BACKGROUND

The present disclosure pertains to data updates and in particular to updates of master data retrieved from a queue in one or more communications.

Modern software may not be built as single monolith that consists well-integrated components but may be built as a collection of several loosely-coupled applications, such as cloud or on premise applications. These applications and services might use different technologies and there may be challenges regarding integration in end to end processes. In such an integration various protection goals, such as availability and integrity of data, may be desired. However, there may be various threats to such scenarios since such cloud environments are typically network based. In the face of such threats, the software must be operated in an efficient manner.

Such issues may arise in the distribution of master data. Master data refers to data that is shared across loosely-coupled applications and that is used in the transaction and operations of the applications. Master data may not be representative of or characterize individual transactions or operations, but may used across multiple similar transactions or operations. For instance, employee information (e.g., name, address, phone number, bank account number) may be stored as an employee master data object and shared between a human resources application, a resource planning application, and a travel-booking application such that the same employee information may be referenced in each of these use cases.

When it comes to distribution of master data from one application to other applications, a middleware update system might be used to avoid point-to-point connections. In some situations two or more different updates to the same master data object or field may be provided to the middleware update system. This may be problematic when the application uses that master data object just prior to or during an update process.

As such, there is a need for improved data consistency in master data integration. The present disclosure addresses these issues and others, as further described below.

SUMMARY

One embodiment provides a computer system comprising one or more processors and one or more machine-readable medium coupled to the one or more processors. The one or more machine-readable medium storing computer program code comprising sets of instructions. The sets of instructions executable by the one or more processors to receive, from an update system, a first communication including a first set of updated master data objects and a first indication that there are further updated master data objects queued at the update system. The first set of updated master data objects being updates to a first set of corresponding master data objects stored in a database. The sets of instructions further executable by the one or more processors to set a flag for each of the first set of updated master data objects in the database, where a first flag for a first master data object is set. The sets of instructions further executable by the one or more processors to store each of the first set of updated master data objects in the database, where the first master data object is stored. The sets of instructions further executable by the one or more processors to obtain a first request to access the first master data object stored in the database. The sets of instructions further executable by the one or more processors to determine that the first flag for the first master data object is set. The sets of instructions further executable by the one or more processors to deny the first request to access the first master data object based on the first flag for the first master data object being set.

Another embodiment provides one or more non-transitory computer-readable medium storing computer program code. The computer program code comprising sets of instructions to receive, from an update system, a first communication including a first set of updated master data objects and a first indication that there are further updated master data objects queued at the update system. The first set of updated master data objects being updates to a first set of corresponding master data objects stored in a database. The computer program code further comprising sets of instructions to set a flag for each of the first set of updated master data objects in the database, a first flag for a first master data object being set. The computer program code further comprising sets of instructions to store each of the first set of updated master data objects in the database, the first master data object being stored. The computer program code further comprising sets of instructions to obtain a first request to access the first master data object stored in the database. The computer program code further comprising sets of instructions to determine that the first flag for the first master data object is set. The computer program code further comprising sets of instructions to deny the first request to access the first master data object based on the first flag for the first master data object being set.

Another embodiment provides a computer-implemented method. The method comprises receiving, from an update system, a first communication including a first set of updated master data objects and a first indication that there are further updated master data objects queued at the update system. The first set of updated master data objects being updates to a first set of corresponding master data objects stored in a database. The method further comprises setting a flag for each of the first set of updated master data objects in the database, a first flag for a first master data object being set. The method further comprises storing each of the first set of updated master data objects in the database, the first master data object being stored. The method further comprises obtaining a first request to access the first master data object stored in the database. The method further comprises determining that the first flag for the first master data object is set. The method further comprises denying the first request to access the first master data object based on the first flag for the first master data object being set.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As mentioned above, modern software may not be built as single monolith that consists well-integrated components but may be built as a collection of several loosely-coupled applications that run in the cloud. These cloud applications may comprise various services, including micro services. In some embodiments, one or more monolithic applications may be integrated with cloud-based services. The cloud-based applications and services might use different technologies and there may be challenges regarding integration in end to end processes. In such an integration various protection goals, such as availability and integrity of data, may be desired. However, since such cloud environments are typically network based, they are at risk of network failures or delays. In the face of such problems, the software must be operated in an efficient manner.

Such issues may arise in the distribution of master data. Master data refers to data that may be referenced by transactional data. For example, one or more transactions (or none) may reference the same customer record. In this example, the customer record is master data. Master data may be shared across loosely-coupled applications and that is used in the transaction and operations of the applications. In some cases, master data may be used by a standalone application. Master data may not be representative of or characterize individual transactions or operations, but may used across multiple similar transactions or operations. For instance, employee information (e.g., name, address, phone number, bank account number) may be stored as an employee master data object and shared between a human resources application, a resource planning application, and a travel-booking application such that the same employee information may be referenced in each of these use cases.

When it comes to distribution of master data from one application to other applications, a middleware update system might be used to avoid point-to-point connections. In some situations two or more different updates to the same master data object may be provided to the middleware update system. This may be problematic when the application uses that master data object just prior to or during an update process. It may also be problematic when master data is read from the database after a first update was fetched (if the first update contains wrong or inaccurate data), before a second update is fetched.

For example, an employee's bank account number may be incorrectly entered into a human resources application as an update to a master data object for that employee. The error may have been recognized and a second update to the master data object for that employee may be submitted including the employee's correct bank account number. When a travel application fetches updates to master data, the master data object including the incorrect bank account number may be processed before the second master data object including the correct bank account number is fetched and updated in the database. There is the possibility that the travel application processes a transaction using the incorrect bank account number before the correct bank account number is updated. The data consistency techniques described herein may solve this issue by ensuring that the incorrect bank account number is not used while the correct bank account number is in the queue to be updated.

One aspect of the data consistency techniques described herein involves extending a master data tuple by a flag that indicates that an update process affecting this master data object is running. Accordingly, access to that master data may be denied when the update process is running. Providing such a flag is advantageous because processing of data that might be outdated due to technical failures in the update mechanism may be denied.

Another aspect of the data consistency techniques described here involves preventing storing when an update process is running using a unique identifier that is associated with a master data object and all data derived from that master data object. Using a unique identifier that is propagated to all derived data is advantageous because when data is processed (and a copy of that data is stored in the work memory) and during that processing, the data object in the database gets changed, the process of the outdated data may be stopped by throwing an exception. This may only affect such processes in that outdated data objects are involved.

Another aspect of the data consistency techniques described here involves using a unique identifier per attribute of the master data object. Using unique identifiers per attribute is advantageous because the usage of data is traceable on attribute level. Therefore, the stopping of processes can be limited to such processes that are affected by updated data. If a data object is outdated but the changes in the data object are not relevant for the process (e.g. because only an attribute is changed that is not used in that process) such processes are not stopped, thus the disturbance is limited as much as possible.

These data consistency techniques may be used to improve master data integration across applications as further described below.

Figure 1:
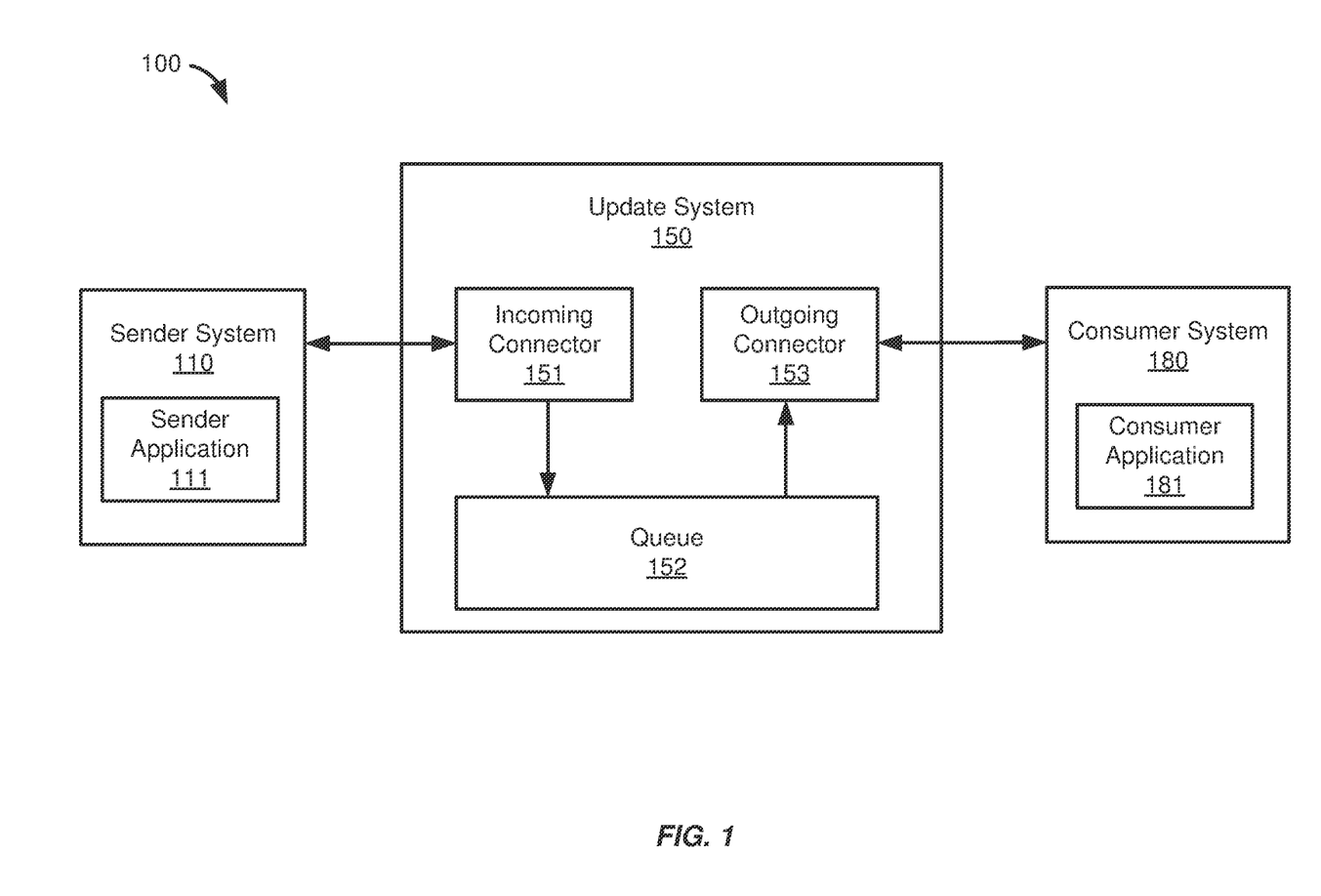
FIG. 1 shows a diagram of an update system in communication with a sender system and a consumer system, according to an embodiment.

As discussed above, master data may be distributed across loosely-coupled applications using an update system (e.g., middleware). FIG. 1 shows a diagram 100 of an update system 150 in communication with a sender system 110 and a consumer system 180, according to an embodiment. These systems may be implemented using hardware as discussed below with respect to FIG. 6.

The sender system 110 includes a sender application 111, which may be a cloud-based application or an on-premise application. The sender application 111 may be referred to as the "sender" because it sends updates of master data to the update system 150. The consumer system 180 includes a consumer application 181, which may also be a cloud-based application. The consumer application 181 may be referred to as the "consumer" because it may consume (e.g., process or fetch) updates from the update system 150. The update system 150 may be referred to as a "middleware" system since it operates between the sender system 110 and the consumer system 180. The update system 150 middleware may be used to avoid point-to-point connections. In this scenario, there may be more than one sending applications, and applications might be sending applications for one type of master data and receiving applications for another type of master data, or for the same type of master data.

The update system 150 includes an incoming connector 151 configured to receive a request including updated master data from the sender system 110. The updated master data may be stored in a queue 152. The queue 152 may temporarily store data provided by the sender system 110 such that the consumer system 180 may request it. The update system 150 also includes an outgoing connector 153 configured to receive fetch requests from the consumer system 180. The outgoing connector 153 may send the updated master data to the consumer system 180 in response to such fetch requests. The updated master data may be sent to the consumer system in batches (e.g., of 20, or 100, etc.).

In some embodiments, the update system 150 may provide an application programming interface (API) for requesting updates on master data objects. This interface may be configured to providing fetching of the next n objects in the queue. In some embodiments, the objects fetched from the queue may be the oldest (i.e., earlier updates made before later updates). In some embodiments, the interface may respond to a fetch request with a response communication of "m objects, object1, object2, . . . object m" (with m lower or equal n). In some embodiments, the interface may respond with an indication that there are "no further objects in the queue," if the present communication includes the final remaining objects to be updated for the requesting application. In other embodiments a different style of API may be used to fetch data objects. The techniques described herein may be applied to other styles of APIs that include an indicator of whether there are further updates to fetch or not.

For simplicity, FIG. 1 shows one sender system and one consumer system. However, there may be multiple sender systems and multiple consumer systems. And each system may be both a sender and a consumer. In some embodiments, the update system may have a separate consumer queue for each consumer, while an additional sender would send data to the existing queue. That is, there may be one queue per consumer, and that queue may contain the data from of all of the senders.

In certain situations, it may happen that more than one master data object for the same underlying entity (e.g., employee) is contained in the queue with different attributes. This may occur when the sending application sends two updates. For instance, a user first creates a new master data record, then realizes one attribute is wrong, and then edits the record immediately after it was saved and saves it again. Typically, the consuming application may not request new master data immediately but once a day, once an hour, or once every ten minutes, for example. In the described circumstances, the consuming application requests the updates from the update system and gets the object two times from the queue: the outdated (incorrect) version and then the later (correct) version. Both objects may be delivered in different communications (e.g., packages) to the application. In some situations, it may be the responsibility of the receiving application to ensure to keep only the latest version and to ensure to not process the incorrect version when the master data update process is not completed. The update system may not perform such checks since it requires substantial computing resources to check whether an object to be inserted into the queue may already be contained within the queue.

Due to technical problems, it may happen that the second message with the latest master data value for the master data object is delayed (e.g., due to network issues, a hacker attack, a firewall issue, a denial-of-service, etc.). In such a case, the consumer application receiving the master data updates should ensure that operations based on the incoming data are not processed before the entire update process is completed (e.g., all batches of updates are processed).

There are several possible solutions to data consistency problems that are not sufficient for handling master data integration across applications. One insufficient approach would be to stop all threads (or processes) that process any data while the update is running and allow new threads (or processes) for processing after the update is completed. However, that might interrupt the operation of the application heavily. Another insufficient approach is data "quarantining" as performed by anti-virus tools where a file cannot be accessed or executed until the user approved it. This approach is insufficient because preventing access to master data should be a temporary measure that is ended automatically. Quarantine measures implemented in virtual machines are also insufficient for similar reasons. Write-locks and similar techniques where two threads (or processes) cannot access the same memory are also insufficient for handling master data updates because the master data may be updated in batches such that access to the master object is written to the database the first time and a new transaction based on it may be created when the second update to that master data arrives.

Figure 2:
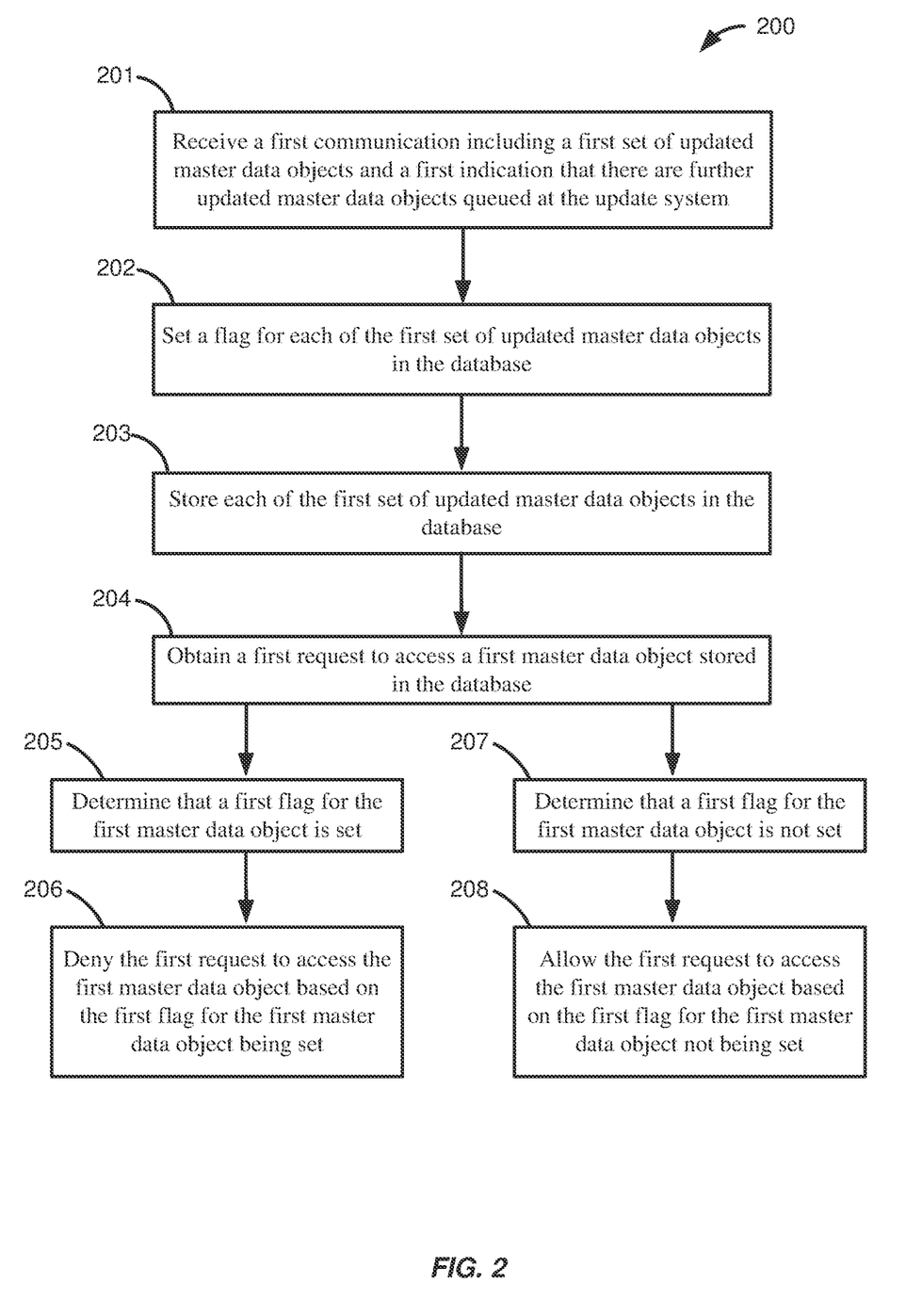
FIG. 2 shows a flowchart of a computer-implemented method for data consistency, according to an embodiment.

The data consistency techniques in master data integration described herein improve upon these approaches. One method providing data consistency in master data integration is now described. FIG. 2 shows a flowchart 200 of a computer-implemented method for data consistency, according to an embodiment. The method may be performed by the consumer system described above.

At 201, the method receives a first electronic communication (e.g., package) including a first set of updated master data objects and a first indication that there are further updated master data objects queued at the update system. The first communication may be received from an update server in response to a fetch request sent to the update server. In some embodiments, the request and response may be made using hypertext transfer protocol (HTTP), for example. The communication may include a first indication that there are further updated master data objects queued at the update system. Further updated master data objects may be queued at the update system as the update system may provide updated master data in batches.

At 202, the method sets a flag for each of the first set of updated master data objects in the database. For example, master data may be stored (e.g., in a database) at the consumer system as a master data tuple and the tuple may be extended by a flag that indicates that an update process that affects this object is running (e.g., the flag indicates that this object was updated already during the currently running update process). In some embodiments, the table for such master data may be extended by one further column (or row, depending on architecture) for the flags. The flag column may not be visible to or accessible by the consumer application. The flags may only be accessible by an update loader and a database access portion of the consumer system. In some embodiments the flag may be an attribute of type Boolean. In some embodiments, a flag for each master data object may be set to True as it is received from the update system and then all flags may be set to False once the entire update process is completed (e.g., after processing/updating a response from the update system that indicates that there are no further updates). This flag may be used to determine whether the particular master data object may be accessed (e.g., by a database access class).

At 203, the method stores each of the first set of updated master data objects in the database. The updated master data objects may include new master data objects or updates to existing master data objects. That is, the updated master data objects may be for a new entity (e.g., a new employee) not represented by any existing master data object or they may be for an entity already represented by a stored master data object. As mentioned above, the master data may be stored as a master data tuple and the tuple may be extended by a flag that indicates that an update process is running.

At 204, the method obtains a first request to access a first master data object stored in the database. The request may be obtained by an application running at the system (e.g., at the consumer system). For example, the system performing the method may run a travel-booking application and it may process a transaction based on travel expenses for an employee represented by a master data object. The employee's master data object may include the employee's bank account number and the transaction process may access the employee's master data object to obtain the bank account number.

The method then determines whether a first flag for the first master data object is set. For example, the flag may be a Boolean and it may be "set" when it is True and it may be "removed" or "not set" when it is False.

At 205, the method determines that a first flag for the first master data object is set (e.g., the Boolean is set to True).

At 206, the method may deny the first request to access the first master data object based on the first flag for the first master data object being set. Access is denied because an update process involving that master data object may still be in progress. Denying access is advantageous because it may prevent the possibility that operations or transactions are performed using outdated or incorrect master data that would be updated or corrected later on in the update process.

However, the master data being accessed may not be involved in an update process (or an update process many not currently be running). In such situations, at 207, the method determines that a first flag for the first master data object is not set. Then at 208, the method allows the first request to access the first master data object based on the first flag for the first master data object not being set. In this situation, the master data may be presumed to be correct, at least since the last update time.

Figure 3:
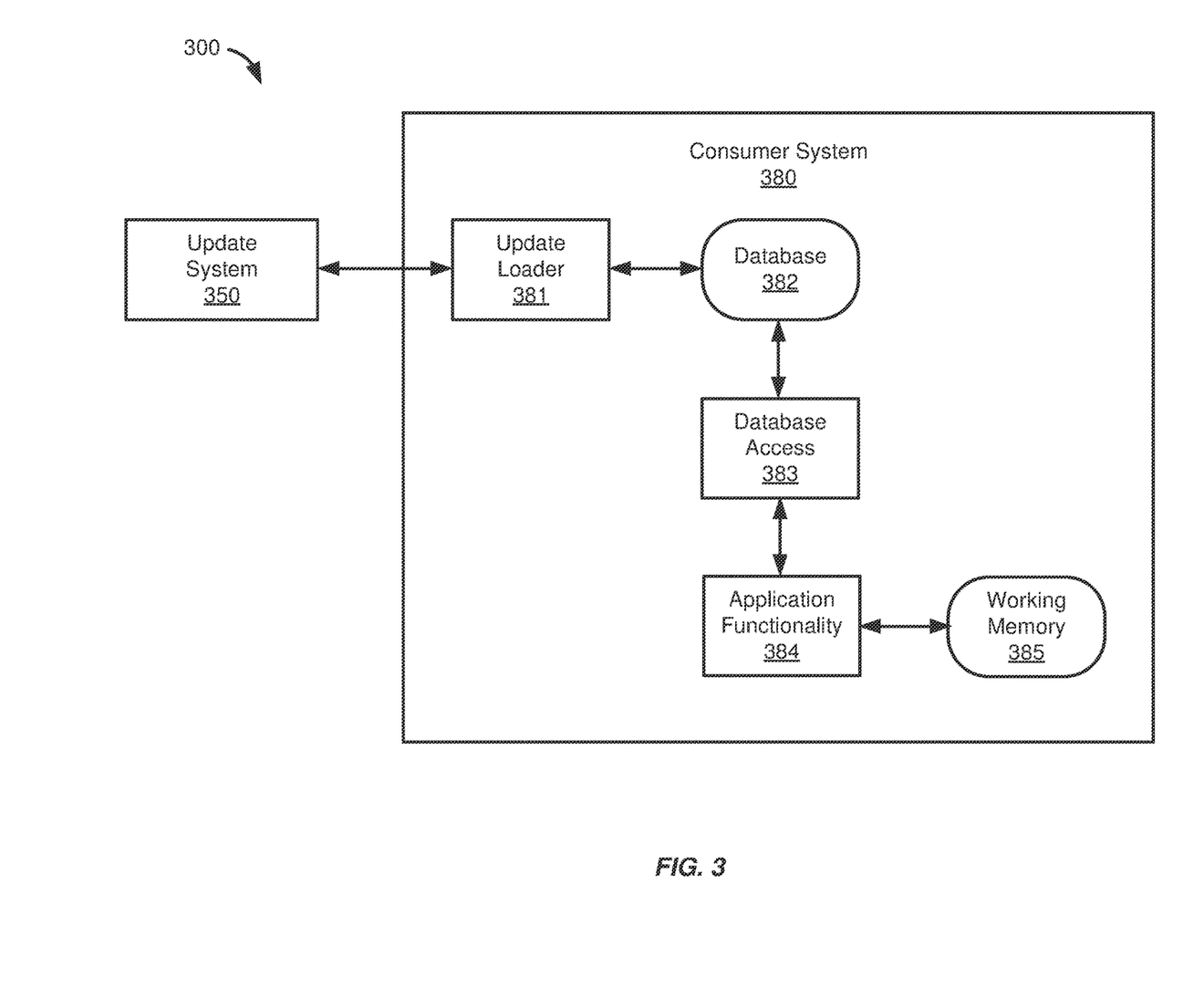
FIG. 3 shows a diagram of a consumer system providing data consistency, according to an embodiment.

FIG. 3 shows a diagram 300 of a consumer system 380 providing data consistency, according to an embodiment. The consumer system 380 is in communication with an update system 350. The communication system 380 and the update system 350 may be configured similar to those discussed above. The consumer system 380 includes an update loader 381, a database 382, a database access module 383, an application functionality module 384, and a working memory 385. These portions of the consumer system 380 may be configured to perform the data consistency method described above with respect to FIG. 2. The update 381 may fetch updated master data from the update system. The database 382 may store master data and other information. The database access module 383 (e.g., database access class) may access information in the database and be configured to deny access to master data that is currently involved in an update process. The application functionality module 384 may be configured to perform the functions of a particular application (e.g., a travel-booking application, a human resource application, a resource planning application, etc.). The working memory 385 may be a system memory or main memory temporarily storing data that is being used by the application functionality 384.

The update loader 381 may be configured to send a request to the update system to fetch updated master data. The updated master data may be fetched as discussed above. For instance, the data may be received in batches from the update system 350. The updated master data received from the update system 350 may have their flags set to indicate that the update process is ongoing and this master data may be stored in the database 382. For example, as soon as the update process for a particular master data object is running, the flag may be set to True. This indicates that this object may not be used (e.g., it should not be returned by the database access module 383). In general, if the flag is set then all actions that involve the object may be canceled. For example, if the database is instructed to count how many objects with a certain property are contained in the database, the database access class or the database may be configured to determine whether an object has the flag set. If the flag was set (e.g., the object was locked) during the count operation, then the account operation may be repeated. After the update process is completed, the flag will be set to False. This indicates that the master data object can be used again (e.g., it can be returned by the database access module 383 when the application requests it). The update process might be considered as completed when the update system returns "No further objects," or when the last batch of updated master data is stored, for example.

The database access module 383 (e.g., database access class) may be configured such that it throws exceptions when this flag is set to true. The application functionality module 384 may be configured to catch the exception and react accordingly (e.g. by retrying the action later or showing error messages to the user).

Pseudo code describing this data consistency technique is provided in Listing 1 below:

```
                            Listing 1
    Bool done = false;
    While(done == false) {
      Response = LoadUpdates( );
      If(Response == "No further objects"){
        setAllFlagsToFalse( );
        done = true;
      }
      Else {
        for(object in Response.objects){
          object.setFlagToTrue( );
          object.insertUpdateIntoDatabase( );
        }
      }
    }
```

The techniques described above are advantageous because access and processing of master data that might be outdated due to technical failures in the update mechanism may be denied based on the flag being set.

In addition, the data consistency techniques may be further enhanced such that the system may stop current or preexisting processes that use a particular master data object which gets updated during those processes. This step requires that the application platform supports taint tracking. For instance, when a master object gets accessed via the respective access class, the access class may return in the respective master data objects an identifier (e.g., a universally unique identifier (UUID)) in hidden taint data that is propagated through all further processing steps of that data as long as the object or any derived objects are not removed from the working memory. If objects are derived from a tainted object, the derived objects having the UUID in their taint data may still be in working memory and the original object may be removed from the working memory. This process may happen even if there is no master data update running. This is advantageous because it is now possible for a process to know which master data objects are used. Accordingly, when data is processed (and a copy of that data is stored in the working memory) and during that processing, the data object in the database gets changed, the process of the outdated data may be stopped by throwing an exception. This technique may only affect such processes where outdated data objects are involved. In some embodiments this technique may be implemented in the database access module. In such embodiments, processes may be stopped when they would be written to the database. In other embodiments, outgoing data may be checked for validity and an exception may be thrown if the data is outdated. In other embodiments this technique may be implemented using a process stopper (described below with respect to FIG. 4).

In either embodiment, the master data objects may be associated with an identifier, such as a UUID. The UUID may be a long random number that is unique. Each object in the database may be associated, in the database, with a UUID. When an object is retrieved from the database, the database access module (e.g., database access module 383 in FIG. 3) may taint the object with the identifier of that object. Here, "taint" means that the system is configured to propagate this identifier through all further processing steps of that data as long as the object or any derived objects are not removed from the main memory. Thus, all data derived from or based on the tainted object may also be tainted with the identifier of that object. Taint tracking enables the database access module to know the identifier of the object thorough metadata for the object, for example. This taint data may be hidden from the applications run time (e.g., it may not be visible to the application).

For example, when the database access class returns an employee's master data including a bank account number, that master data object may be "tainted" by the UUID of that master data object by including the UUID in metadata for the master data object. This UUID may be included in metadata for any operations performed based on that master data object. That is, the UUID stays with the content of the object, not just with a particular object or variable itself. Therefore, even when the employee's bank account number is extracted and included in a transaction object, that transaction object may also include the UUID of the employee's master data object in metadata of the transaction object. Taint tracking ensures that the UUID is also added as taint data to the newly created objects. Taint tracking also ensures that the UUID is added as taint data when an existing object is modified or updated based on a tainted object having that UUID (e.g., when values of variables are added or subtracted, etc.). Thus, the database access module may be able to determine whether certain data is associated with a particular master data object based on the identifier being associated with that data (e.g., included in metadata for that object).

This technique provides data consistency in the following situation. A sending application (e.g., a human resource application) may update the bank account number of the employee, which is then sent to the update system as updated master data. This updated master data is fetched by a consumer application. Just prior to the fetching of the updated master data, a consumer application initiates the transfer of salary to the employee based on an account number in a master data object. Then the update process begins, fetching the updated master data including an update to that same employee's account number. In this situation, the master data object has already been accessed by the consumer application before the flag described above may have been set because the update process was not yet running. However, after the update process starts, the consumer application requests to write a transfer object to the database using the account number. Using the taint tracking techniques described above, the employee's master data object would be tainted with an identifier when it was provided to the consumer application and the transfer object may also be tainted with that same identifier. Therefore, the database access module may be able to determine that the employee master data object was affected by the update during the processing by the consumer application. That is, the database access module may determine that data within the transfer object was derived from the employee object and the employee object was changed after the employee object was read from the database. For example, taint tracking metadata for the object may include a timestamp of when the data was accessed and the database access module may compare this timestamp to a "last modified" timestamp in the database for that same object. Therefore, the database access module may determine that the transaction was based on outdated data and the data may not be written. In some embodiments, outgoing data may be checked for validity and an exception may be thrown if the data is outdated.

An exemplary process using this technique may involve a computer system (e.g., a consumer system) obtaining a request (e.g., from an application) to access a stored master data object stored in a database of the computer system. The system may determine a unique identifier for the stored master data object. The unique identifier may be associated with the stored master data object and further associated with all data processed based on the third stored master data object (e.g., using taint tracking techniques). The computer system may provide (e.g., to the application), in response to the request, the stored master data object associated with the unique identifier. The computer system may then store, after providing the stored master data object, an updated master data object as an update to the stored master data object. The updated master data object may be stored during an update process as discussed above. Then the computer system may obtain, after storing the updated master data object, a request (e.g., from the application) to store data processed based on the stored master data object. The fourth data may be associated with the same unique identifier (e.g., due to taint tracking mechanisms).

The computer system may determine that the stored master data object was updated after the provision of the stored master data object in response to the request. In this case, the computer system may deny the request to store the data based on the determination that the stored master data object was updated.

This is advantageous because when data is processed, and during that processing the data object in the database gets changed or updated, the processing of the outdated data can be stopped by throwing an exception. This may only affect such processes in that outdated data objects are involved.

Figure 4:
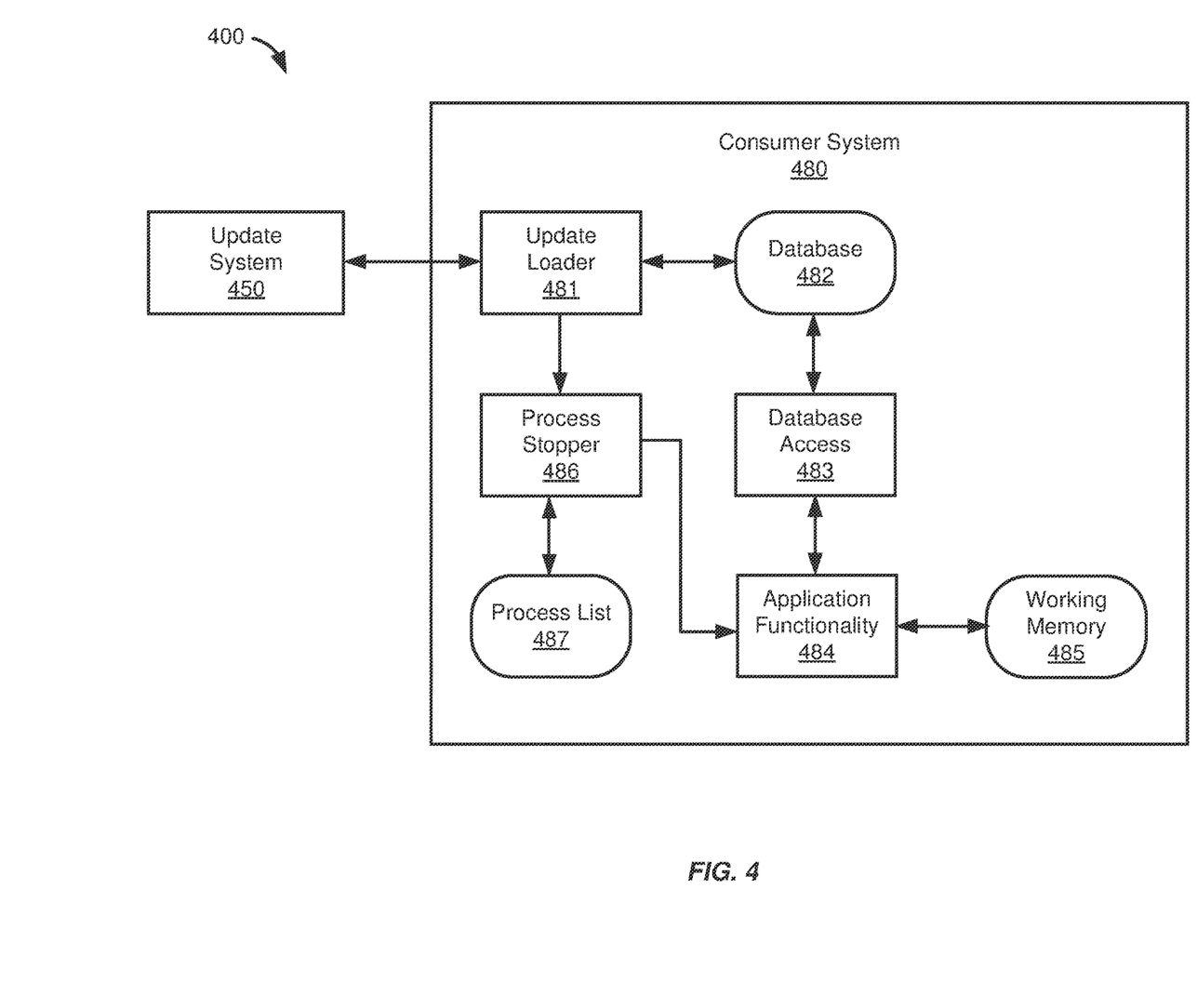
FIG. 4 shows a diagram of a consumer system providing data consistency using a process stopper, according to an embodiment.

As mentioned above, taint tracking techniques may also be implemented using a process stopper. FIG. 4 shows a diagram 400 of a consumer system 480 providing data consistency using a process stopper module 486, according to an embodiment. The consumer system 480 may be in communication with an update system 450. The consumer system includes an update loader 481, a database 482, a database access module 483, an application functionality module 484, and a working memory 485. The consumer system and these components may be configured similar to those described above with respect to FIG. 3.

The process stopper module 486 may access a process list 487. The process list 487 may contain a list of all processes running in the working memory 485. The process stopper 486 may be configured to compare a timestamp of when a master data object was accessed to when that master data object was updated in the database 482, as discussed above. One difference from the technique described above is that the process stopper 486 may be called by the update loader 481 and the process stopper may stop the entire working memory 485 to determine whether a data object in the working memory 485 includes a particular identifier in its taint data (e.g., in the corresponding metadata) and then stop that process. The advantage of stopping the process is similar to the advantages of taint tracking described above. The process stopping technique is advantageous because when data is processed, and during that processing the data object in the database gets changed or updated, the processing of the outdated data can be stopped by throwing an exception.

The taint tracking techniques may be further enhanced such that the usage of data is traceable on attribute level (e.g., per attribute of an object) and the stopping of processes can be limited to such processes that are affected by updated data. For instance, if a data object is outdated but the changes in the data object are not relevant for the process (e.g. because only an attribute is changed that is not used in that process) such processes are not stopped, thus the disturbance is limited as much as possible.

Figure 5:
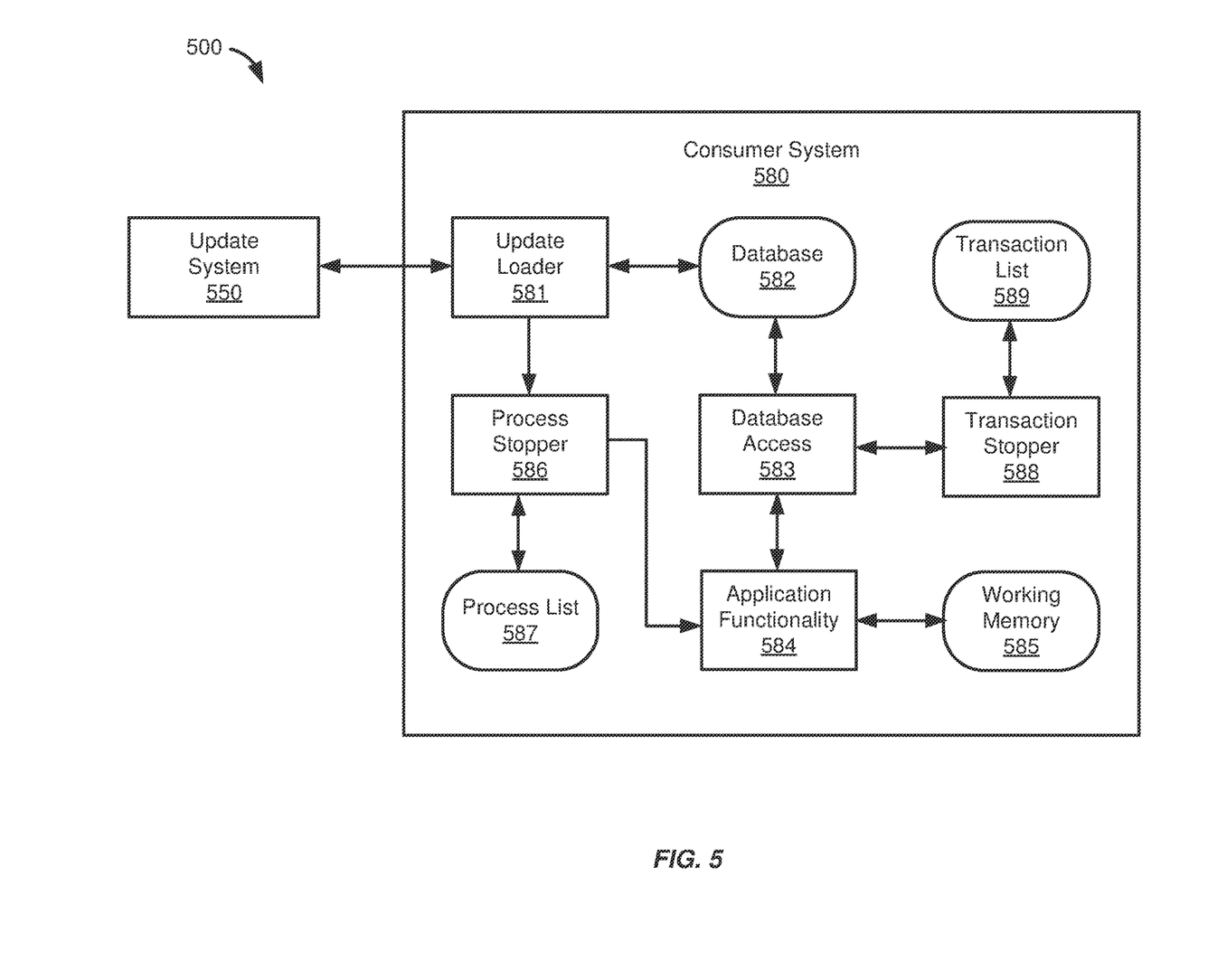
FIG. 5 shows a diagram of a consumer system providing data consistency using a transaction stopper, according to an embodiment.

FIG. 5 shows a diagram 500 of a consumer system 580 providing data consistency using a transaction stopper, according to an embodiment. The consumer system 580 may provide taint tracking on an attribute level as further discussed below. The consumer system 580 may be in communication with an update system 550. The consumer system 580 includes an update loader 581, a database 582, a database access module 583, an application functionality module 584, and a working memory 585. The consumer system 580 and these components may be configured similar to those described above with respect to FIG. 3 and FIG. 4. In some embodiments, the consumer system 580 may include a process stopper module 586 and a process list 587 similar to those discussed above with respect to FIG. 4. In addition, the consumer system 580 includes a transaction stopper module 588 and a transaction list 589.

In addition to or as an alternative to the taint tracking techniques described above, a unique taint tracking identifier is provided per attribute of an object. Through taint tracking mechanisms, the consumer system can track where attributes of affected master data objects are used. This allows the consumer system to determine where the values of certain attributes are used during a process even if the relation to the master object is lost. Tracking is possible because the relation from the data object in the work memory to the data object in the database will exist due to taint tracking measures (e.g., the identifier is propagated through all derived processes).

For instance, the transaction stopper module 588 may check when a database commit should be done (e.g., when a transaction in the transaction list 589 is finished) that this transaction was not affected by any changed attribute. For example, if the master data object for an employee has a date-of-birth attribute, and only this attribute is changed in an update process (e.g., due to a typographical or clerical error), then the update of this attribute may not affect transactions based on the employee's account number attribute and not based on their date-of-birth attribute.

An exemplary process using this technique may involve a computer system obtaining a request to access a stored master data object that is stored in a database. The computer system may determine a set of unique identifiers for each attribute of the stored master data object when it is accessed (e.g., by a database access module). Each unique identifier of the set of the unique identifiers may be associated with all data processed based on or derived based on the corresponding attribute of the stored master data object. In this example, the set of unique identifiers includes a first identifier for a first attribute of the stored master data object. The computer system may then provide (e.g., to an application), in response to the request, the stored master data object. The computer system may store, after providing the stored master data object, an updated master data object as an update to the stored master data object. Thus, the first attribute that was provided to the application may be outdated depending on whether the first attribute was updated or whether other attributes of the master data object were updated instead.

The computer system may then obtain, after storing the updated master data object, a request (e.g., from the application) to store data processed based on the stored master data object. The data may be associated with the first unique identifier of the first attribute, which may or may not be outdated. The computer system may then determine whether the first attribute of the stored master data object was updated after the provision of the stored master data object in response to the third request. In cases where the first attribute of the stored master data object was updated, the computer system may deny the request to store the data. In cases where the first attribute of the stored master data object was not updated (e.g., other attributes were updated), the computer system may allow the request to store the data.

Thus, when an update on the data objects in the database is running, the database commits may only be executed by the database access module 583 if the relating attributes of the data object were not changed in the update process (e.g., if the identifier the attributes of the updated master data under consideration is not set). Thus, the stopping of processes can be limited to such processes that are affected by updated data, thereby limiting the disturbance caused by stopping processes.

Figure 6:
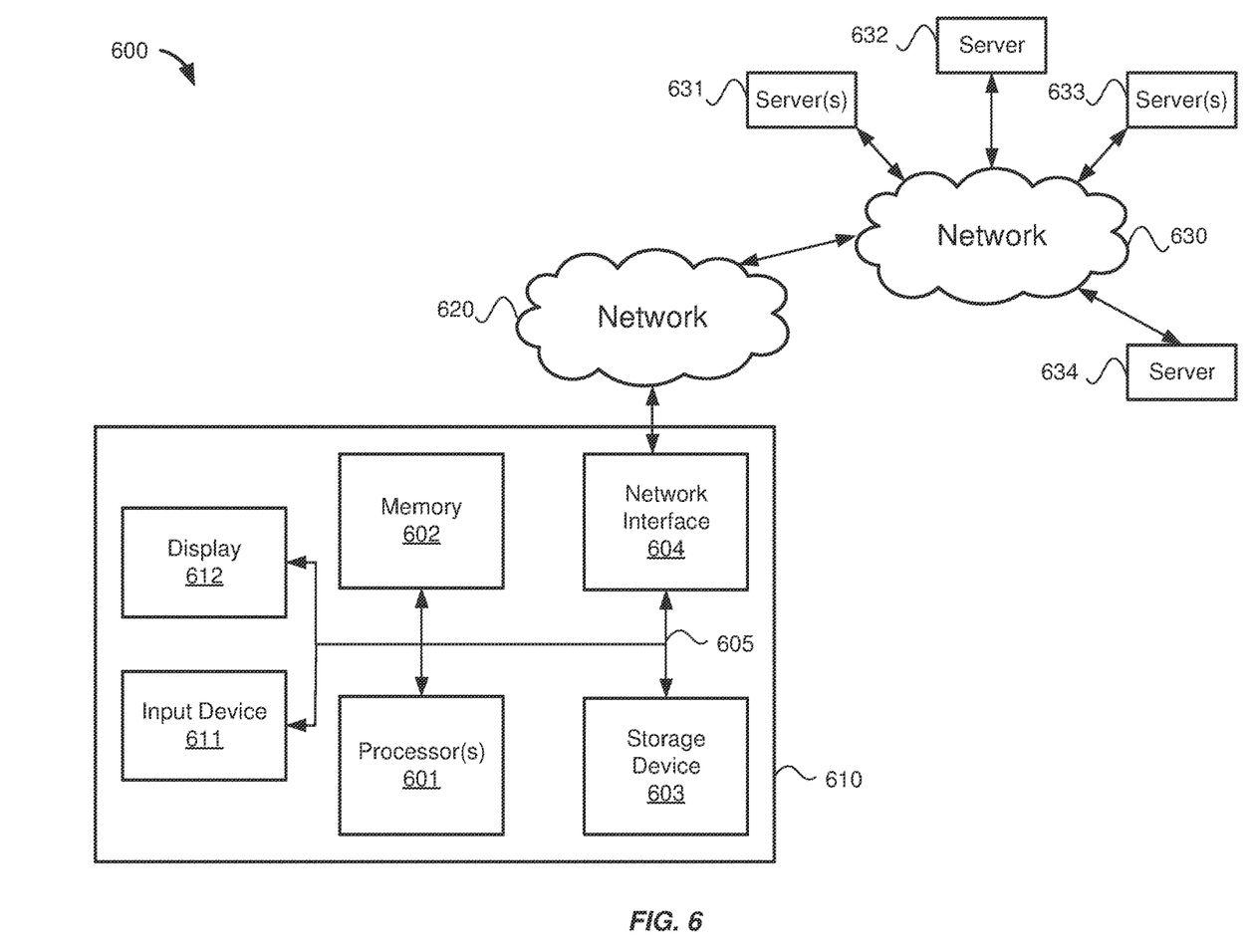
FIG. 6 shows a diagram of hardware of a special purpose computing machine for implementing systems and methods described herein.

FIG. 6 shows a diagram 600 of hardware of a special purpose computing machine for implementing the data consistency techniques described herein. A computer system 610 includes a bus 605 or other communication mechanism for communicating information, and one or more processors 601 coupled with bus 605 for processing information. The computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, such as the processes described above, for example. Storage device and memory are both examples of non-transitory computer readable storage mediums.

The computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

The computer system also includes a network interface 604 coupled with bus 605. The network interface 604 may provide two-way data communication between computer system 610 and a network 620. The network interface 604 may be a wireless or wired connection, for example. The computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

Additional Embodiments

Additional embodiments of the present disclosure are further described below.

One embodiment provides a computer system comprising one or more processors and one or more machine-readable medium coupled to the one or more processors. The one or more machine-readable medium storing computer program code comprising sets of instructions. The sets of instructions executable by the one or more processors to receive, from an update system, a first communication including a first set of updated master data objects and a first indication that there are further updated master data objects queued at the update system. The first set of updated master data objects being updates to a first set of corresponding master data objects stored in a database. The sets of instructions further executable by the one or more processors to set a flag for each of the first set of updated master data objects in the database, where a first flag for a first master data object is set. The sets of instructions further executable by the one or more processors to store each of the first set of updated master data objects in the database, where the first master data object is stored. The sets of instructions further executable by the one or more processors to obtain a first request to access the first master data object stored in the database. The sets of instructions further executable by the one or more processors to determine that the first flag for the first master data object is set. The sets of instructions further executable by the one or more processors to deny the first request to access the first master data object based on the first flag for the first master data object being set.

In some embodiments of the computer system, the denying of the request includes throwing a software exception.

In some embodiments of the computer system, the database stores each master data object as a tuple, the tuple including a flag settable to deny access to that master data object.

In some embodiments of the computer system, the sets of instructions are executable by the one or more processors to receive, from the update system, a second communication including a second set of updated master data objects and a second indication that there are no further updated master data objects queued at the update system. The second set of updated master data objects being updates to a second set of corresponding master data objects stored in a database. In such embodiments, the sets of instructions are executable by the one or more processors to set a flag for each of the second set of updated master data objects in the database. In such embodiments, the sets of instructions are executable by the one or more processors to store each of the second set of updated master data objects in the database. In such embodiments, the sets of instructions are executable by the one or more processors to remove flags for each master data object in the database such that the flags are not set, the first flag for the first master data object being removed and not set. In such embodiments, the sets of instructions are executable by the one or more processors to obtain a second request to access the first master data object stored in the database. In such embodiments, the sets of instructions are executable by the one or more processors to determine that the first flag for the first master data object is not set. In such embodiments, the sets of instructions are executable by the one or more processors to allow the request to access the first master data object based on the first flag for the first master data object not being set.

In some embodiments of the computer system, the sets of instructions are executable by the one or more processors to obtain a third request to access a third stored master data object stored in the database. In such embodiments, the sets of instructions are executable by the one or more processors to determine a unique identifier for the third stored master data object. The unique identifier being associated with the third stored master data object and associated with all data processed based on the third stored master data object. In such embodiments, the sets of instructions are executable by the one or more processors to provide, in response to the third request, the third stored master data object associated with the unique identifier. In such embodiments, the sets of instructions are executable by the one or more processors to store, after providing the third stored master data object, an updated third master data object as an update to the third stored master data object. In such embodiments, the sets of instructions are executable by the one or more processors to obtain, after storing the updated third master data object, a fourth request to store fourth data processed based on the third stored master data object, where the fourth data is associated with the unique identifier. In such embodiments, the sets of instructions are executable by the one or more processors to determine that the third stored master data object was updated after the provision of the third stored master data object in response to the third request. In such embodiments, the sets of instructions are executable by the one or more processors to deny the fourth request to store the fourth data based on the determination that the third stored master data object was updated.

In some embodiments of the computer system, the sets of instructions are executable by the one or more processors to obtain a third request to access a third stored master data object stored in the database. In such embodiments, the sets of instructions are executable by the one or more processors to determine a set of unique identifiers for each attribute of the third stored master data object. Each unique identifier of the set of the unique identifiers being associated all data processed based on the corresponding attribute of the third stored master data object. The set of unique identifiers including a first identifier for a first attribute of the third stored master data object. In such embodiments, the sets of instructions are executable by the one or more processors to provide, in response to the third request, the third stored master data object. In such embodiments, the sets of instructions are executable by the one or more processors to store, after providing the third stored master data object, an updated third master data object as an update to the third stored master data object. The updated third master data object including an update to the first attribute. In such embodiments, the sets of instructions are executable by the one or more processors to obtain, after storing the updated third master data object, a fourth request to store fourth data processed based on the third stored master data object. The fourth data associated with the first unique identifier. In such embodiments, the sets of instructions are executable by the one or more processors to determine that the first attribute of the third stored master data object was updated after the provision of the third stored master data object in response to the third request. In such embodiments, the sets of instructions are executable by the one or more processors to deny the fourth request to store the fourth data based on the determination that the first attribute of the third stored master data object was updated.

In some embodiments of the computer system, the sets of instructions are executable by the one or more processors to obtain a third request to access a third stored master data object stored in the database. In such embodiments, the sets of instructions are executable by the one or more processors to determine a set of unique identifiers for each attribute of the third stored master data object. Each unique identifier of the set of the unique identifiers is associated all data processed based on the corresponding attribute of the third stored master data object. The set of unique identifiers including a first identifier for a first attribute of the third stored master data object and a second identifier for a second attribute of the third stored master data object. In such embodiments, the sets of instructions are executable by the one or more processors to provide, in response to the third request, the third stored master data object. In such embodiments, the sets of instructions are executable by the one or more processors to store, after providing the third stored master data object, an updated third master data object as an update to the third stored master data object. The updated third master data object including an update to the first attribute. In such embodiments, the sets of instructions are executable by the one or more processors to obtain, after storing the updated third master data object, a fourth request to store fourth data processed based on the third stored master data object. The fourth data associated with the second unique identifier. In such embodiments, the sets of instructions are executable by the one or more processors to determine that the second attribute of the third stored master data object was not updated after the provision of the third stored master data object in response to the third request. In such embodiments, the sets of instructions are executable by the one or more processors to allow the fourth request to store the fourth data based on the determination that the second attribute of the third stored master data object was not updated.

Another embodiment provides one or more non-transitory computer-readable medium storing computer program code. The computer program code comprising sets of instructions to receive, from an update system, a first communication including a first set of updated master data objects and a first indication that there are further updated master data objects queued at the update system. The first set of updated master data objects being updates to a first set of corresponding master data objects stored in a database. The computer program code further comprising sets of instructions to set a flag for each of the first set of updated master data objects in the database, a first flag for a first master data object being set. The computer program code further comprising sets of instructions to store each of the first set of updated master data objects in the database, the first master data object being stored. The computer program code further comprising sets of instructions to obtain a first request to access the first master data object stored in the database. The computer program code further comprising sets of instructions to determine that the first flag for the first master data object is set. The computer program code further comprising sets of instructions to deny the first request to access the first master data object based on the first flag for the first master data object being set.

In some embodiments of the non-transitory computer-readable medium, the denying of the request includes throwing a software exception.

In some embodiments of the non-transitory computer-readable medium, the database stores each master data object as a tuple, the tuple including a flag settable to deny access to that master data object.

In some embodiments of the non-transitory computer-readable medium, the computer program code further comprising sets of instructions to receive, from the update system, a second communication including a second set of updated master data objects and a second indication that there are no further updated master data objects queued at the update system. The second set of updated master data objects being updates to a second set of corresponding master data objects stored in a database. In such embodiments, the computer program code further comprising sets of instructions to set a flag for each of the second set of updated master data objects in the database. In such embodiments, the computer program code further comprising sets of instructions to store each of the second set of updated master data objects in the database. In such embodiments, the computer program code further comprising sets of instructions to remove flags for each master data object in the database such that the flags are not set. The first flag for the first master data object being removed and not set. In such embodiments, the computer program code further comprising sets of instructions to obtain a second request to access the first master data object stored in the database. In such embodiments, the computer program code further comprising sets of instructions to determine that the first flag for the first master data object is not set. In such embodiments, the computer program code further comprising sets of instructions to allow the request to access the first master data object based on the first flag for the first master data object not being set.

In some embodiments of the non-transitory computer-readable medium, the computer program code further comprising sets of instructions to receive, from the update system, a second communication including a second set of updated master data objects and a second indication that there are no further updated master data objects queued at the update system. The second set of updated master data objects being updates to a second set of corresponding master data objects stored in a database. In such embodiments, the computer program code further comprising sets of instructions to set a flag for each of the second set of updated master data objects in the database. In such embodiments, the computer program code further comprising sets of instructions to store each of the second set of updated master data objects in the database. In such embodiments, the computer program code further comprising sets of instructions to remove flags for each master data object in the database such that the flags are not set, the first flag for the first master data object being removed and not set. In such embodiments, the computer program code further comprising sets of instructions to obtain a second request to access the first master data object stored in the database. In such embodiments, the computer program code further comprising sets of instructions to determine that the first flag for the first master data object is not set. In such embodiments, the computer program code further comprising sets of instructions to allow the request to access the first master data object based on the first flag for the first master data object not being set.

In some embodiments of the non-transitory computer-readable medium, the computer program code further comprising sets of instructions to obtain a third request to access a third stored master data object stored in the database. In such embodiments, the computer program code further comprising sets of instructions to determine a set of unique identifiers for each attribute of the third stored master data object. Each unique identifier of the set of the unique identifiers being associated all data processed based on the corresponding attribute of the third stored master data object. The set of unique identifiers including a first identifier for a first attribute of the third stored master data object. In such embodiments, the computer program code further comprising sets of instructions to provide, in response to the third request, the third stored master data object. In such embodiments, the computer program code further comprising sets of instructions to store, after providing the third stored master data object, an updated third master data object as an update to the third stored master data object. The updated third master data object including an update to the first attribute.

In such embodiments, the computer program code further comprising sets of instructions to obtain, after storing the updated third master data object, a fourth request to store fourth data processed based on the third stored master data object. The fourth data associated with the first unique identifier. In such embodiments, the computer program code further comprising sets of instructions to determine that the first attribute of the third stored master data object was updated after the provision of the third stored master data object in response to the third request. In such embodiments, the computer program code further comprising sets of instructions to deny the fourth request to store the fourth data based on the determination that the first attribute of the third stored master data object was updated.

In some embodiments of the non-transitory computer-readable medium, the computer program code further comprising sets of instructions to obtain a third request to access a third stored master data object stored in the database. In such embodiments, the computer program code further comprising sets of instructions to determine a set of unique identifiers for each attribute of the third stored master data object. Each unique identifier of the set of the unique identifiers being associated all data processed based on the corresponding attribute of the third stored master data object. The set of unique identifiers including a first identifier for a first attribute of the third stored master data object and a second identifier for a second attribute of the third stored master data object. In such embodiments, the computer program code further comprising sets of instructions to provide, in response to the third request, the third stored master data object. In such embodiments, the computer program code further comprising sets of instructions to store, after providing the third stored master data object, an updated third master data object as an update to the third stored master data object, the updated third master data object including an update to the first attribute. In such embodiments, the computer program code further comprising sets of instructions to obtain, after storing the updated third master data object, a fourth request to store fourth data processed based on the third stored master data object. The fourth data associated with the second unique identifier. In such embodiments, the computer program code further comprising sets of instructions to determine that the second attribute of the third stored master data object was not updated after the provision of the third stored master data object in response to the third request. In such embodiments, the computer program code further comprising sets of instructions to allow the fourth request to store the fourth data based on the determination that the second attribute of the third stored master data object was not updated.

Another embodiment provides a computer-implemented method. The method comprises receiving, from an update system, a first communication including a first set of updated master data objects and a first indication that there are further updated master data objects queued at the update system. The first set of updated master data objects being updates to a first set of corresponding master data objects stored in a database. The method further comprises setting a flag for each of the first set of updated master data objects in the database, a first flag for a first master data object being set. The method further comprises storing each of the first set of updated master data objects in the database, the first master data object being stored. The method further comprises obtaining a first request to access the first master data object stored in the database. The method further comprises determining that the first flag for the first master data object is set. The method further comprises denying the first request to access the first master data object based on the first flag for the first master data object being set.

In some embodiments of the method, the denying of the request includes throwing a software exception, and the database stores each master data object as a tuple. The tuple including a flag settable to deny access to that master data object.

In some embodiments, method further comprises receiving, from the update system, a second communication including a second set of updated master data objects and a second indication that there are no further updated master data objects queued at the update system. The second set of updated master data objects being updates to a second set of corresponding master data objects stored in a database. The method further comprises setting a flag for each of the second set of updated master data objects in the database. The method further comprises storing each of the second set of updated master data objects in the database. The method further comprises removing flags for each master data object in the database such that the flags are not set, the first flag for the first master data object being removed and not set. The method further comprises obtaining a second request to access the first master data object stored in the database. The method further comprises determining that the first flag for the first master data object is not set. The method further comprises allowing the request to access the first master data object based on the first flag for the first master data object not being set.

In some embodiments, method further comprises obtaining a third request to access a third stored master data object stored in the database. The method further comprises determining a unique identifier for the third stored master data object. The unique identifier being associated with the third stored master data object and associated with all data processed based on the third stored master data object. The method further comprises providing, in response to the third request, the third stored master data object associated with the unique identifier. The method further comprises storing, after providing the third stored master data object, an updated third master data object as an update to the third stored master data object. The method further comprises obtaining, after storing the updated third master data object, a fourth request to store fourth data processed based on the third stored master data object. The fourth data associated with the unique identifier. The method further comprises determining that the third stored master data object was updated after the provision of the third stored master data object in response to the third request. The method further comprises denying the fourth request to store the fourth data based on the determination that the third stored master data object was updated.

In some embodiments, method further comprises obtaining a third request to access a third stored master data object stored in the database. The method further comprises determining a set of unique identifiers for each attribute of the third stored master data object. Each unique identifier of the set of the unique identifiers being associated all data processed based on the corresponding attribute of the third stored master data object. The set of unique identifiers including a first identifier for a first attribute of the third stored master data object. The method further comprises providing, in response to the third request, the third stored master data object. The method further comprises storing, after providing the third stored master data object, an updated third master data object as an update to the third stored master data object. The updated third master data object including an update to the first attribute. The method further comprises obtaining, after storing the updated third master data object, a fourth request to store fourth data processed based on the third stored master data object. The fourth data associated with the first unique identifier. The method further comprises determining that the first attribute of the third stored master data object was updated after the provision of the third stored master data object in response to the third request. The method further comprises denying the fourth request to store the fourth data based on the determination that the first attribute of the third stored master data object was updated.

In some embodiments, method further comprises obtaining a third request to access a third stored master data object stored in the database. The method further comprises determining a set of unique identifiers for each attribute of the third stored master data object. Each unique identifier of the set of the unique identifiers being associated all data processed based on the corresponding attribute of the third stored master data object. The set of unique identifiers including a first identifier for a first attribute of the third stored master data object and a second identifier for a second attribute of the third stored master data object. The method further comprises providing, in response to the third request, the third stored master data object. The method further comprises storing, after providing the third stored master data object, an updated third master data object as an update to the third stored master data object. The updated third master data object including an update to the first attribute. The method further comprises obtaining, after storing the updated third master data object, a fourth request to store fourth data processed based on the third stored master data object. The fourth data associated with the second unique identifier. The method further comprises determining that the second attribute of the third stored master data object was not updated after the provision of the third stored master data object in response to the third request. The method further comprises allowing the fourth request to store the fourth data based on the determination that the second attribute of the third stored master data object was not updated.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:
1. A computer system, comprising:
one or more processors; and
one or more machine-readable media coupled to the one or more processors and storing computer program code comprising sets of instructions executable by the one or more processors to:
receive, from an update system, a first communication including a first set of updated master data objects and a first indication that there are further updated master data objects queued at the update system, the first set of updated master data objects being updates to a first set of corresponding master data objects stored in a database;
set a flag for each of the first set of updated master data objects in the database, a first flag for a first master data object being set;
store each of the first set of updated master data objects in the database, the first master data object being stored;
obtain a first request to access the first master data object stored in the database;
determine that the first flag for the first master data object is set;
deny the first request to access the first master data object based on the first flag for the first master data object being set;
receive, from the update system, a second communication including a second set of updated master data objects and a second indication that there are no further updated master data objects queued at the update system, the second set of updated master data objects being updates to a second set of corresponding master data objects stored in the database;
set a flag for each of the second set of updated master data objects in the database;
store each of the second set of updated master data objects in the database; and
remove flags for each master data object in the database such that the flags are not set, the first flag for the first master data object being removed and not set.

2. The computer system of claim 1, wherein the denying of the request includes throwing a software exception.

3. The computer system of claim 1, wherein the database stores each master data object as a tuple, the tuple including the flag settable to deny access to that master data object.

4. The computer system of claim 1, wherein the computer program code further comprises sets of instructions executable by the one or more processors to:
obtain a second request to access the first master data object stored in the database;
determine that the first flag for the first master data object is not set; and
allow the request to access the first master data object based on the first flag for the first master data object not being set.

5. The computer system of claim 4, wherein the computer program code further comprises sets of instructions executable by the one or more processors to:
obtain a third request to access a third stored master data object stored in the database;
determine a unique identifier for the third stored master data object, the unique identifier being associated with the third stored master data object and associated with all data processed based on the third stored master data object;
provide, in response to the third request, the third stored master data object associated with the unique identifier;
store, after providing the third stored master data object, an updated third master data object as an update to the third stored master data object;
obtain, after storing the updated third master data object, a fourth request to store fourth data processed based on the third stored master data object, the fourth data associated with the unique identifier;
determine that the third stored master data object was updated after provision of the third stored master data object in response to the third request; and
deny the fourth request to store the fourth data based on the determination that the third stored master data object was updated.

6. The computer system of claim 4, wherein the computer program code further comprises sets of instructions executable by the one or more processors to:
obtain a third request to access a third stored master data object stored in the database;
determine a set of unique identifiers for each attribute of the third stored master data object, each unique identifier of the set of unique identifiers being associated with all data processed based on a corresponding attribute of the third stored master data object, the set of unique identifiers including a first identifier for a first attribute of the third stored master data object;
provide, in response to the third request, the third stored master data object;
store, after providing the third stored master data object, an updated third master data object as an update to the third stored master data object, the updated third master data object including an update to the first attribute;
obtain, after storing the updated third master data object, a fourth request to store fourth data processed based on the third stored master data object, the fourth data associated with the first identifier;
determine that the first attribute of the third stored master data object was updated after provision of the third stored master data object in response to the third request; and
deny the fourth request to store the fourth data based on the determination that the first attribute of the third stored master data object was updated.

7. The computer system of claim 4, wherein the computer program code further comprises sets of instructions executable by the one or more processors to:
obtain a third request to access a third stored master data object stored in the database;
determine a set of unique identifiers for each attribute of the third stored master data object, each unique identifier of the set of unique identifiers being associated with all data processed based on a corresponding attribute of the third stored master data object, the set of unique identifiers including a first identifier for a first attribute of the third stored master data object and a second identifier for a second attribute of the third stored master data object;
provide, in response to the third request, the third stored master data object;
store, after providing the third stored master data object, an updated third master data object as an update to the third stored master data object, the updated third master data object including an update to the first attribute;
obtain, after storing the updated third master data object, a fourth request to store fourth data processed based on the third stored master data object, the fourth data associated with the second identifier;
determine that the second attribute of the third stored master data object was not updated after provision of the third stored master data object in response to the third request; and
allow the fourth request to store the fourth data based on the determination that the second attribute of the third stored master data object was not updated.

8. One or more non-transitory computer-readable medium storing computer program code comprising sets of instructions to:
  receive, from an update system, a first communication including a first set of updated master data objects and a first indication that there are further updated master data objects queued at the update system, the first set of updated master data objects being updates to a first set of corresponding master data objects stored in a database;
  set a flag for each of the first set of updated master data objects in the database, a first flag for a first master data object being set;
  store each of the first set of updated master data objects in the database, the first master data object being stored;
  obtain a first request to access the first master data object stored in the database;
  determine that the first flag for the first master data object is set;
  deny the first request to access the first master data object based on the first flag for the first master data object being set;
  receive, from the update system, a second communication including a second set of updated master data objects and a second indication that there are no further updated master data objects queued at the update system, the second set of updated master data objects being updates to a second set of corresponding master data objects stored in the database;
  set a flag for each of the second set of updated master data objects in the database;
  store each of the second set of updated master data objects in the database; and
  remove flags for each master data object in the database such that the flags are not set, the first flag for the first master data object being removed and not set.

9. The non-transitory computer-readable medium of claim 8, wherein the denying of the request includes throwing a software exception.

10. The non-transitory computer-readable medium of claim 8, wherein the database stores each master data object as a tuple, the tuple including the flag settable to deny access to that master data object.

11. The non-transitory computer-readable medium of claim 8, wherein the computer program code further comprises sets of instructions to:
  obtain a second request to access the first master data object stored in the database;
  determine that the first flag for the first master data object is not set; and
  allow the request to access the first master data object based on the first flag for the first master data object not being set.

12. The non-transitory computer-readable medium of claim 11, wherein the computer program code further comprises sets of instructions to:
  receive, from the update system, a second communication including a second set of updated master data objects and a second indication that there are no further updated master data objects queued at the update system, the second set of updated master data objects being updates to a second set of corresponding master data objects stored in the database;
  set a flag for each of the second set of updated master data objects in the database;
  store each of the second set of updated master data objects in the database;
  remove flags for each master data object in the database such that the flags are not set, the first flag for the first master data object being removed and not set;
  obtain a second request to access the first master data object stored in the database;
  determine that the first flag for the first master data object is not set; and
  allow the request to access the first master data object based on the first flag for the first master data object not being set.

13. The non-transitory computer-readable medium of claim 11, wherein the computer program code further comprises sets of instructions to:
  obtain a third request to access a third stored master data object stored in the database;
  determine a set of unique identifiers for each attribute of the third stored master data object, each unique identifier of the set of unique identifiers being associated with all data processed based on a corresponding attribute of the third stored master data object, the set of unique identifiers including a first identifier for a first attribute of the third stored master data object;
  provide, in response to the third request, the third stored master data object;
  store, after providing the third stored master data object, an updated third master data object as an update to the third stored master data object, the updated third master data object including an update to the first attribute;
  obtain, after storing the updated third master data object, a fourth request to store fourth data processed based on the third stored master data object, the fourth data associated with the first identifier;
  determine that the first attribute of the third stored master data object was updated after provision of the third stored master data object in response to the third request; and
  deny the fourth request to store the fourth data based on the determination that the first attribute of the third stored master data object was updated.

14. The non-transitory computer-readable medium of claim 11, wherein the computer program code further comprises sets of instructions to:
  obtain a third request to access a third stored master data object stored in the database;
  determine a set of unique identifiers for each attribute of the third stored master data object, each unique identifier of the set of unique identifiers being associated with all data processed based on a corresponding attribute of the third stored master data object, the set of unique identifiers including a first identifier for a first attribute of the third stored master data object and a second identifier for a second attribute of the third stored master data object;
  provide, in response to the third request, the third stored master data object;
  store, after providing the third stored master data object, an updated third master data object as an update to the third stored master data object, the updated third master data object including an update to the first attribute;
  obtain, after storing the updated third master data object, a fourth request to store fourth data processed based on the third stored master data object, the fourth data associated with the second identifier;
  determine that the second attribute of the third stored master data object was not updated after provision of the third stored master data object in response to the third request; and allow the fourth request to store the fourth data based on the determination that the second attribute of the third stored master data object was not updated.

15. A computer-implemented method, comprising:
receiving, from an update system, a first communication including a first set of updated master data objects and a first indication that there are further updated master data objects queued at the update system, the first set of updated master data objects being updates to a first set of corresponding master data objects stored in a database;
setting a flag for each of the first set of updated master data objects in the database, a first flag for a first master data object being set;
storing each of the first set of updated master data objects in the database, the first master data object being stored;
obtaining a first request to access the first master data object stored in the database;
determining that the first flag for the first master data object is set;
denying the first request to access the first master data object based on the first flag for the first master data object being set;
receiving, from the update system, a second communication including a second set of updated master data objects and a second indication that there are no further updated master data objects queued at the update system, the second set of updated master data objects being updates to a second set of corresponding master data objects stored in the database;
setting a flag for each of the second set of updated master data objects in the database;
storing each of the second set of updated master data objects in the database; and
removing flags for each master data object in the database such that the flags are not set, the first flag for the first master data object being removed and not set.

16. The computer-implemented method of claim 15, wherein the denying of the request includes throwing a software exception, and wherein the database stores each master data object as a tuple, the tuple including the flag settable to deny access to that master data object.

17. The computer-implemented method of claim 15, further comprising:
obtaining a second request to access the first master data object stored in the database;
determining that the first flag for the first master data object is not set; and
allowing the request to access the first master data object based on the first flag for the first master data object not being set.

18. The computer-implemented method of claim 17, further comprising:
obtaining a third request to access a third stored master data object stored in the database;
determining a unique identifier for the third stored master data object, the unique identifier being associated with the third stored master data object and associated with all data processed based on the third stored master data object;
providing, in response to the third request, the third stored master data object associated with the unique identifier;
storing, after providing the third stored master data object, an updated third master data object as an update to the third stored master data object;
obtaining, after storing the updated third master data object, a fourth request to store fourth data processed based on the third stored master data object, the fourth data associated with the unique identifier;
determining that the third stored master data object was updated after provision of the third stored master data object in response to the third request; and
denying the fourth request to store the fourth data based on the determination that the third stored master data object was updated.

19. The computer-implemented method of claim 17, further comprising:
obtaining a third request to access a third stored master data object stored in the database;
determining a set of unique identifiers for each attribute of the third stored master data object, each unique identifier of the set of unique identifiers being associated with all data processed based on a corresponding attribute of the third stored master data object, the set of unique identifiers including a first identifier for a first attribute of the third stored master data object;
providing, in response to the third request, the third stored master data object;
storing, after providing the third stored master data object, an updated third master data object as an update to the third stored master data object, the updated third master data object including an update to the first attribute;
obtaining, after storing the updated third master data object, a fourth request to store fourth data processed based on the third stored master data object, the fourth data associated with the first identifier;
determining that the first attribute of the third stored master data object was updated after provision of the third stored master data object in response to the third request; and
denying the fourth request to store the fourth data based on the determination that the first attribute of the third stored master data object was updated.

20. The computer-implemented method of claim 17, further comprising:
obtaining a third request to access a third stored master data object stored in the database;
determining a set of unique identifiers for each attribute of the third stored master data object, each unique identifier of the set of unique identifiers being associated with all data processed based on a corresponding attribute of the third stored master data object, the set of unique identifiers including a first identifier for a first attribute of the third stored master data object and a second identifier for a second attribute of the third stored master data object;
providing, in response to the third request, the third stored master data object;
storing, after providing the third stored master data object, an updated third master data object as an update to the third stored master data object, the updated third master data object including an update to the first attribute;
obtaining, after storing the updated third master data object, a fourth request to store fourth data processed based on the third stored master data object, the fourth data associated with the second identifier;
determining that the second attribute of the third stored master data object was not updated after provision of the third stored master data object in response to the third request; and
allowing the fourth request to store the fourth data based on the determination that the second attribute of the third stored master data object was not updated.

* * * * *